United States Patent [19]

Hwa et al.

[11] Patent Number: 5,069,798

[45] Date of Patent: Dec. 3, 1991

[54] CONTROL OF SCALE IN AQUEOUS SYSTEMS USING CERTAIN PHOSPHONOMETHYL AMINES

[75] Inventors: Chih M. Hwa, Palatine; John A. Kelly, Crystal Lake, both of Ill.; Janet Neton, West Chester, Ohio; Patricia M. Scanlon, Arlington, Mass.; Roger R. Gaudette, Hudson, N.H.

[73] Assignee: W. R. Grace & Co.-Conn., New York, N.Y.

[21] Appl. No.: 451,484

[22] Filed: Dec. 15, 1989

[51] Int. Cl.$^5$ ............................................. C02F 5/14
[52] U.S. Cl. ..................................... 210/700; 252/180
[58] Field of Search ............... 210/696, 698, 699, 700; 252/180

[56] References Cited

U.S. PATENT DOCUMENTS

| | | | |
|---|---|---|---|
| 2,964,549 | 12/1960 | Ramsey et al. | 260/438 |
| 3,214,454 | 10/1965 | Blaser et al. | 260/429.9 |
| 3,336,221 | 8/1967 | Ralston | 210/58 |
| 3,429,914 | 2/1969 | Crutchfield et al. | 210/700 |
| 3,474,133 | 10/1989 | Crutchfield et al. | 210/502.5 |
| 4,079,006 | 3/1978 | Mitchell | 210/700 |
| 4,216,163 | 8/1980 | Sommer et al. | 260/502.5 |
| 4,234,511 | 11/1980 | Buckman | 210/700 |
| 4,308,147 | 12/1981 | Sommer et al. | 210/700 |
| 4,617,129 | 10/1986 | Lees | 210/700 |
| 4,747,975 | 5/1988 | Ritter | 252/87 |
| 4,931,189 | 6/1990 | Dhawan et al. | 210/700 |

FOREIGN PATENT DOCUMENTS 2165228 4/1986 United Kingdom ................ 252/180

OTHER PUBLICATIONS

"Cyclishe Intramolekulare Ester von Athanolamin-N-methylenphosphonsauren"; Worms et al; Zeitschrift fur anorganische und allgemeine Chemie, Band 381, 1971; pp. 260–265.

"The Direct Synthesis of α-Amino-methylphosphonic Acids"; Moedritzer et al; Mannich-Type Reactions with Orthophosphorous Acid, May 1966; pp. 1603–1607.

"Hydrogen Peroxide Oxidation of Tertiary Amines"; Hoh et al; Journal of the American Oil Chemists' Society, Jul. 1963, Issue vol. LV, No. 7, pp. 268–271.

"Recent Advances in Fatty Amine Oxides. Part I. Chemistry and Preparation"; Lake et al; Journal of the American Oil Chemists' Society, Nov. 1963, Issue, vol. 40, No. 11, pp. 628–631.

"Analysis of Reaction Mixtures from the Hydrogen Peroxide Oxidation of Dimethyldodecylamine by the Preferred Method"; Dupont Technical Information.

"Detoxication Mechanisms. II. The Iron Catalyzed Dealkylation of Trimethylamine Oxide"; Ferris et al; Journal of the American Chemical Society/89:20/Sep. 27, 1967, pp. 5270–5275.

Kirk–Othmer, Encylopedia of Chemical Technology, Third Edition, vol. 2, p. 259, John Wiley & Sons, New York, 1978–Amine Oxides.

"Chlorine-Resistant, Sequestering-Dispersing Agent-"-Sequion OA; Giovanni Bozzetto, pp. 10–12.

*Primary Examiner*—Peter Hruskoci
*Assistant Examiner*—Krisanne Shideler
*Attorney, Agent, or Firm*—James P. Barr

[57] ABSTRACT

This invention relates to certain calcium insensitive phosphonomethyl amine compounds and their use as scale control agents for treating aqueous systems. The compounds of this invention are water-soluble phosphonomethyl amine compounds having the formula:

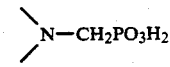

and water soluble salts thereof selected from the group consisting of N-phosphonomethyl iminodiacetic acid, N,N-bis-phosphonomethyl- 2-(hydroxyethoxy)ethylamine, 4-(phosphonomethyl)-2-hydroxy-2-oxo-1,4,2-oxazaphosphorinane, N,N-bis-phosphonomethyl taurine and N,N-bis-phosphonomethyl ethylamine; and having a cloud point of at least about 25 ppm as determined by the CA500 cloud point test or a water soluble salt of said phosphonomethyl amine.

1 Claim, No Drawings

CONTROL OF SCALE IN AQUEOUS SYSTEMS USING CERTAIN PHOSPHONOMETHYL AMINES

FIELD OF THE INVENTION

This invention relates to controlling scale formation in aqueous systems and more particularly to using organic phosphonate compounds which are effective for controlling scale in aqueous systems.

BACKGROUND OF THE INVENTION

A serious problem in industrial water systems, especially in cooling water systems, industrial evaporators, and boilers is the deposition of scale, particularly scale-forming salts such as certain carbonates, hydroxides, silicates and sulfates of cations such as calcium and magnesium from aqueous solutions onto heat transfer surfaces. Much of water used in cooling water systems is supplied by the rivers, lakes, ponds, or the like and contains various amounts of scale-forming salts. In cooling tower systems, the cooling effect is achieved by evaporation of a portion of the circulating water in passing over the tower. Because of the evaporation which takes place in cooling, the solids in the water become concentrated. Moreover, because of the inverse solubility of calcium carbonate, calcium sulfate and other hardness salts, the problem of the formation of water-insoluble scales on the heat transfer surfaces is intensified.

Various organic phosphonates have been considered for use in scale control. U.S. Pat. No. 3,336,221 discloses a method of inhibiting the precipitation of scale-forming salts in an aqueous system comprising adding to said system compounds having a methylphosphonic acid bonded to a nitrogen atom such as amino tri (methylphosphonic acid). U.S. Pat No. 3,214,454 teaches use of certain acylation products of phophorous acid (e.g. hydroxyethylidene diphosphonic acid) for scale control. Unfortunately, various phosphonates including amino tri(methylphosphonic acid) and hydroxyethylidene diphosphonic acid are very sensitive to calcium hardness and prone to form calcium phosphonate precipitates.

U.S. Pat. No. 3,474,133 discloses that certain organo-phosphono-amine oxide compounds can be prepared by oxidizing organo-phosphono amine with a suitable oxidizing agent. For instance ethanol bis(dihydrogen phosphonomethyl) amine can be reacted with $H_2O_2$ to yield ethanol bis(dihydrogen phosphonomethyl) amine oxide (i.e. $HOCH_2CH_2N(O)(CH_2PO_3H_2)_2$); and tris(dihydrogen phosphonomethyl) amine can be reacted with $H_2O_2$ to yield tris(dihydrogen phosphonomethyl) amine oxide (i.e. $ON(CH_2PO_3H_2)_3$). It is disclosed that the organo-phosphono amine oxides have utility in practically all fields of organic chemistry wherein their acidic or salt and/or amine oxide properties can be utilized; and the various utilities indicated for the compounds in such fields include utility as sequestering or chelating agents, water treating agents, stabilizers for peroxy compounds and corrosion inhibitors. In particular, the acids and water soluble salts of the tris(phosphono lower alkylidene) amine oxides are reported to exhibit the property of being effective sequestering agents for metal ions in alkaline mediums. For example, the penta sodium salt of tris(dihydrogen phosphonomethyl) amine oxide is reported to sequester calcium ions in alkaline media in over a mole per mole basis. These tri(phosphono lower alkylidene) amine oxide compounds are considered very sensitive to calcium hardness and they are prone to form calcium phosphonate precipitates.

Much recent research has concerned development of organic water treatment agents. Among the organic agents successfully employed for applications involving corrosion or scale control are numerous organic phosphonates. These compounds may generally be used without detrimentally interfering with other conventional water treatment additives. Phosphonic acid compounds have also been used in other fields for such purposes as flame retardants, plasticizers, lubricants, and surfactants.

U.S. Pat. No. 3,429,914 discloses that certain organo-phosphono-amine oxide compounds can be prepared by oxidizing organo-phosphono amine with a suitable oxidizing agent, and discloses that the organophosphono amine oxides have utility in practically all fields of organic chemistry wherein their acidic or salt and/or amine oxide properties can be utilized. The various utilities indicated for the compounds in such fields include utility as sequestering or chelating agents, water treating agents, stabilizers for peroxy compounds and corrosion inhibitors.

U.S. Pat. No. 4,216,163 discloses certain N-sulfo alkane amino alkane phosphonic acids which can be produced by reacting an alkali metal salt of an amino phosphonic acid with a halo or hydroxyalkane sulfonic acid in an alkaline medium, their high resistance against hydrolysis at high temperatures, their very high water solubility, their suitability as complexing or sequestering agents especially with respect to polyvalent metal ions, and their use in substoichiometric amounts to stabilize the hardness of aqueous media, and their advantageous use for preventing scale and deposit formation in aqueous systems as they are employed for instance in textile bleaching baths, in water used for sterilizing cans, for preventing the formation of resinous deposits in the manufacture of paper, and the like. For example, sodium isothionate is reacted with imino bis-methane phosphonic acid (and sodium hydroxide) to yield N,N-bis-phosphonomethane amino ethane sulfonic acid with a thin-layer chromatogram corresponding to that of the product which is obtained on phosphono methylation of taurine by means of phosphorous acid and formaldehyde.

There is a continuing need for safe and effective water treating agents which can be used to control scale formation or to control corrosion, particularly in systems where substantial calcium is present in the system water.

SUMMARY OF THE INVENTION

We have found that the formation of scale in an aqueous system can be inhibited by adding to the system water calcium insensitive water-soluble phosphonomethyl amine having the formula

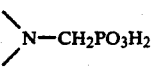

and selected from the group consisting of N-phosphonomethyl iminodiacetic acid, N,N-bis-phosphonomethyl 2-(hydroxyethoxy) ethylamine, 4-(phosphonomethyl)-2-hydroxy-2-oxo-1,4,2-oxazaphosphorinane, N,N-bisphosphonomethyl taurine, and N,N-bisphosphonomethyl ethylamine or a water-soluble salt thereof.

It is an object of this invention to provide scale control in aqueous systems.

It is another object of this invention to provide scale control using an agent which is considered calcium insensitive.

These and other objects and advantages of the present invention will become apparent from the detailed description of the invention which follows.

DETAILED DESCRIPTION

This invention relates to certain calcium insensitive phosphonomethyl amine compounds and their use as scale control agents for treating aqueous systems. Calcium sensitivity refers to the tendency of a compound to precipitate with calcium ions in solution. Calcium insensitivity is considered an important feature of this invention because it allows the agents of this invention to be used effectively in water of relatively high hardness. The test for calcium insensitivity of a compound as used in this application involves a cloud point test where the compound is added to a hard water containing 500 ppm calcium ion (as $CaCO_3$) which is buffered at pH 8.3 using 0.005 M borate buffer and has a temperature of 60° C. The amount of compound which can be added until the solution becomes turbid (the cloud point) is considered to be an indicator of calcium sensitivity. This cloud point test will be referred to herein as the "CA500 cloud point test". The calcium insensitive compounds of this invention have cloud points of at least about 25 ppm as determined by the CA500 cloud point test. Preferred compounds have a cloud point of at least about 50 ppm; and the most preferred compounds have a cloud point of at least about 75 ppm as determined by the CA500 cloud point test because they are considered particularly versatile with regard to the water systems in which they can be effectively used.

Not all organo phosphonates, nor even all organo phosphono amine compounds, exhibit calcium insensitivity. The compounds of this invention are water-soluble phosphonomethyl amine compounds having the formula

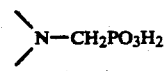

(and water-soluble salts thereof) which are calcium insensitive (i.e. have CA500 cloud points of at least about 25 ppm). These compounds include N-phosphonomethyl iminodiacetic acid, N,N-bis-phosphonomethyl 2-(hydroxyethoxy) ethylamine, 4-(phosphonomethyl)2-hydroxy-2-oxo-1,4,2-oxazaphosphorinane, N,N-bis-phosphonomethyl taurine, and N,N-bis-phosphonomethyl ethylamine and their water-soluble salts.

The phosphonomethyl tertiary amines of the instant invention can be prepared by the known reaction of a nitrogeneous material (iminodiacetic acid, 2-(hydroxethoxy)ethylamine, ethanolamine, taurine or ethylamine) with a compound containing a carbonyl group (formaldehyde or paraformaldehyde) and orthophosphorous acid.

The water soluble salts are readily prepared from the phosphonomethyl amine by neutralizing the phosphonic acid group (and other acid groups) with a stoichiometric amount of a base or salt that contains essentially the desired cation. Bases and salts of acids such as those containing an alkali metal, alkaline earth metal, zinc, aluminum, ammonia and amines such as lower alkyl amines are especially suited, with sodium and potassium salts being preferred. For example, to make a sodium salt, a free acid of the phosphonomethyl amine can be neutralized with a stoichiometric amount of a base containing sodium cation, such as sodium hydroxide. It is noted however that all of the acid hydrogens of the phosphonomethyl amines need not be replaced nor need the cation be the same for each acid hydrogen replaced. Thus the cation may be any one of, or a mixture of, $NH_4^+$, $H^+$, $Na^+$, $K^+$, etc.

Other bases or salts which can be reacted with the free acids to produce salt compounds of the instant invention include the inorganic alkali metal salts, oxides and hydroxides such as $Na_2O$, $Na_2CO_3$, $KOH$, $K_2O$, $K_2CO_3$, $LiOH$, $Li_2CO_3$, $CsOH$, $Cs_2CO_3$, other inorganic salts, and hydroxides such as $Al(OH)_3$, $Al_2(SO_4)_3$, $Al(NO_3)_3$ and $ZnSO_4$ and amines, particularly low molecular weight amines (i.e. amines having a molecular weight below about 300), and more particularly the alkyl amines, alkylene amines and alkanol amines containing not more than 2 amine groups such as ethyl amine, diethylamine, propyl amine, propylene diamine, hexylamine, 2-ethyl hexylamine, N-butylethanol amine, triethanolamine and the like.

For the foregoing methods of preparation, reaction conditions such as temperatures, pH and time for reaction can be varied with the optimum conditions for the reactions being readily ascertained by those skilled in the art. Reference is made to U.S. Pat. No. 3,429,914, which is hereby incorporated herein in its entirety by reference, for a discussion of the preparation of organophosphono amines and their use in preparing organophosphono-amine oxides.

The tertiary phosphonomethyl amine, N,N-bis-phosphonomethyl taurine can be prepared by the known reaction of a nitrogenous material (i.e. taurine; $H_2N-CH_2CH_2SO_3H$) with a compound containing a carbonyl group (i.e. formaldehyde) and orthophosphorous acid. Reference is also made to U.S. Pat. No. 4,216,163 which is hereby incorporated herein in its entirety by reference, for guidance in reacting imino bis-methane phosphonic acid, sodium hydroxide and sodium isethionite to yield a corresponding product.

As other examples of phosphonomethyl amine preparation, N-phosphonomethyl iminodiacetic acid may be prepared by reacting phosphorous acid with paraformaldehyde and iminodiacetic acid; N,N-bis-phosphonomethyl 2-(hydroxyethoxy) ethylamine may be prepared by reacting 2-(hydroxyethoxy) ethylamine with phosphorous acid and formaldehyde; 4-(phosphonomethyl)-2-hydroxy-2-oxo-1,4,2-oxazaphosphorinane may be prepared by reacting ethanolamine with phosphorous acid and formaldehyde and N,N-bis-phosphonomethyl ethylamine may be prepared by reacting ethylamine with phosphorous acid and formaldehyde. The structure of 4(phosphonomethyl)-2-hydroxy-2-oxo-1,4,2-oxzaphosphorinane can be represented as:

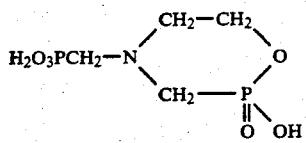

Its CAS registry number is 32422-02-9. This compound is also known as [(tetrahydro-2-hydroxy-4H-1,4,2-oxazaphosphorine-4-yl)methyl] phosphonic acid P-oxide.

These calcium insensitive water-soluble phosphonomethyl amine compounds have been found to be effective for inhibiting the deposit of scale in aqueous systems, including in particular the deposit of scale derived from the system water and containing calcium carbonate, calcium sulfate, calcium phosphate, calcium silicate, magnesium carbonate, magnesium silicate, magnesium phosphate and/or iron oxide, on the metallic structures of industrial water systems. Their use in controlling the deposit of calcium carbonate scale in cooling water systems is considered particularly advantageous. The phosphonomethyl amine compounds are also effective when used in water at high temperatures and pressures in steam generating boilers and remain soluble in water containing substantial hardness and alkalinity. The invention exhibits the threshold effect of the inhibition of formation of scale forming salt crystals and the inhibition of their adherence to heat transfer surfaces at low treatment levels.

In accordance with this invention the formation of scale in aqueous systems may be inhibited by adding an effective amount of the calcium insensitive water-soluble phosphonomethyl amines of this invention (or their water soluble salts) to the system water. The phosphonomethyl amines and their soluble alkali metal salts (usually the sodium salts) are preferred for this purpose.

The precise dosage of phosphonomethyl amine or salt thereof depends, to some extent, on the nature of the aqueous system in which it is to be incorporated and the degree of protection desired. In general, however, it can be said the concentration maintained in the system water can be from about 0.001 to about 1000 ppm. Within this range, generally low dosages of about 200 ppm or less are normally preferred, with a dosage of about 50 ppm or less being most preferred for many aqueous systems (e.g. many open recirculating cooling water systems). Typically dosages of about 0.05 ppm or more are preferred with a dosage of about 0.5 ppm or more being most preferred. For most applications use of a substoichiometric amount is contemplated (i.e. less than the amount required to sequester scale-forming cations such as calcium).

The exact amount required with respect to a particular aqueous system can be readily determined in conventional manners and/or estimated from the alkalinity, pH, calcium concentration, dissolved solids, and water temperature in the systems.

The phosphonomethyl amine or salt thereof may be added to the system water by any convenient mode, such as by first forming a concentrated solution of the phosphonomethyl amine or salt with water (preferably containing between 1 and 50 total weight percent of the phosphonomethyl amines) and then feeding the concentrated solution to the system water at some convenient point in the system. In many instances the compounds may be added to the make-up or feed water lines through which water enters the system. For example, an injector calibrated to deliver a predetermined amount periodically or continuously to the make-up water may be employed.

The present invention is especially useful in the treatment of cooling water systems, which operate at temperatures between about 60° F. and 200° F., particularly open recirculating cooling water systems which operate at temperatures of from about 80° F. to 150° F. The phosphonomethyl amines of this invention are also considered useful in treating the feed water or make-up water in a steam generating boiler. Such boiler systems are generally operated at a temperature of from about 298° to about 700° F. and a pressure of from about 50 to about 3000 psig. The calcium insensitive phosphonomethyl amines of this invention are also considered effective corrosion control agents. Reference is made to U.S. Pat. application Ser. No. 452,153 for further discussion of corrosion control using certain phosphonomethyl amines.

It will be appreciated that while the phosphonomethyl amines of this invention may be used as the sole scale inhibitor for an aqueous system, other ingredients customarily employed in aqueous systems of the type treated herein can be used in addition to the subject phosphonomethyl amines. Other suitable water treatment additives include, for example, many biocides, polymeric agents (e.g. copolymers of 2-acrylamido-2-methyl propane sulfonic acid and methacrylic acid or polymers of acrylic acid or methacrylic acid), other phosphonates, yellow metal corrosion inhibitors (e.g. benzotriazole), other corrosion inhibitors, and the like.

Practice of the invention will become further apparent from the following non-limiting examples.

EXAMPLE I

Calcium sensitivities for the phosphonomethyl amines N,N,-bis-phosphonomethyl taurine, N-phosphonomethyl iminodiacetic acid, N,N-bis-phosphonomethyl 2-(hydroxyethoxy) ethylamine, 4-(phosphonomethyl)-2-hydroxy-2-oxo-1,4,2-oxazaphosphorinane, and N,N-bis-phosphonomethyl ethylamine were respectively tested by the above-described CA500 cloud point test procedure.

In the test the phosphonomethyl amines were respectively added to a 250-ml beaker containing hard water solutions having a temperature of 60° C., having a pH of 8.3, and containing 500 ppm calcium ion (as $CaCO_3$) and 0.005M borate buffer. In each case 100 ppm of the phosphono-methyl amine was added without reaching the cloud point. For comparison, runs were made using amino tri(methyl-phosphonic acid) and hydroxyethylidane diphosphonic acid, neither of which is considered a calcium insensitive compound of the present invention. The results are shown in Table A below.

TABLE A

| Run | Additive | Cloud Point (ppm) |
|---|---|---|
| 1 | N,N-Bis-phosphonomethyl taurine | >100 |
| 2 | N-Phosphonomethyl iminodiacetic acid | >100 |
| 3 | N,N-Bis-phosphonomethyl-2-(hydroxy-ethoxy) ethylamine | >100 |
| 4 | 4-(Phosphonomethyl)-2-hydroxy-2-oxo-1,4,2-oxazaphosphorinane | >100 |
| 5 | N,N-Bis-phosphonomethyl ethylamine | >100 |
| 6 | Amino tri(methylphosphonic acid) | 10 |

TABLE A-continued

| Run | Additive | Cloud Point (ppm) |
|---|---|---|
| 7 | Hydroxyethylidene diphosphonic acid | 7 |

EXAMPLE II

The ability of the phosphonomethyl amines N,N-bis-phosphonomethyl taurine, N-phosphonomethyl iminodiacetic acid, N,N,-bis-phosphonomethyl-2-(hydroxyethoxy) ethylamine, 4-(phosphonomethyl)-2-hydroxy-2-oxo-1,4,2-oxazaphosphorinane, and N,N-bis-phosphonomethyl ethylamine to inhibit calcium carbonate formation was measured using a threshold inhibitor test. In this test 800 ml of a test solution containing 400 ppm calcium (as Ca) and 400 ppm bicarbonate (as $HCO_3$) in a 1000 ml beaker was stirred with a magnetic stir bar and heated using a stainless steel immersion heater to 49° C. The pH was monitored during heating and kept at pH 7.15 with addition of dilute HCl. After the temperature of 49° C. was achieved, 0.1 N NaOH was added to the test solution at a rate of 0.32 ml/min using a syringe pump and the rise in pH was monitored. A decrease or plateau in the rate of pH increase is observed when calcium carbonate starts to precipitate, and the pH at which this decrease or plateau is observed is termed the critical pH. The critical pH for the test solution is shown in Table B below along the total milliequivalents per liter of hydroxide (as NaOH) added to reach the critical pH.

The procedure was repeated using test solutions to which 5 ppm of the respective calcium insensitive phosophonomethyl amine was added. Runs were also made using amino tri(methylphosphonic acid) and N,N-bis-phosphonomethyl ethanolamine. The results are shown in Table B below.

TABLE B

| Run | Additive | Critical pH | NaOH added to reach critical pH (meq/l) |
|---|---|---|---|
| 1 | Blank (without treatment) | 7.69 | 0.48 |
| 2 | N,N-Bis-phosphonomethyl taurine | 8.88 | 2.48 |
| 3 | N-Phosphonomethyl iminodiacetic acid | 8.37 | 1.12 |
| 4 | N,N-Bis-phosphonomethyl 2-(hydroxyethoxy) ethylamine | 8.54 | 1.50 |
| 5 | 4-(Phosphonomethyl)-2-hydroxy-2-oxo-1,4,2-oxazaphosphorinane | 8.15 | 0.84 |
| 6 | N,N-Bis-phosphonomethyl ethylamine | 8.30 | 1.09 |
| 7 | Amino tri(methylphosphonic acid) | 8.50 | 1.38 |
| 8 | N,N-Bis-phosphonomethyl ethanolamine | 8.80 | 2.23 |

As shown in Table B, use of the phosphonomethyl amines of the present invention raised the critical pH and generally resulted in substantially more sodium hydroxide addition before the critical pH was reached. These phosphonomethyl amines are thus effective threshold inhibitors, capable of inhibiting calcium carbonate precipitation.

EXAMPLE III

Scale formation was further tested using an apparatus comprising a covered 28-liter basin, a centrifugal pump which withdraws liquid from the bottom of the basin and circulates it through tubing respectively to a needle valve which allows flow control, a flow meter which allows flow measurement, a glass housing containing an immersion heater for heating the liquid which is returned to the basin. A cooling coil is provided in the basin and is connected such that tap water may be circulated through the cooling coil. The liquid temperature is controlled using a thermoregulator which activates a solenoid valve which controls the flow of tap water through the coil. A pH probe is also located in the basin and is operably connected to a pH controller which in turn controls a pair of solenoid valves which respectively control flow of 0.5 N NaOH and 0.2 N $H_2SO_4$ from 1-liter containers to the basin.

Five liters of test solution containing 600 ppm total hardness (as $CaCO_3$) was transferred to the basin and circulated at a flow rate of 1.4 ft. per second using the centrifugal pump. The pH was controlled within the range of 8.0–8.2 and the variable transformer was turned on such that the heat flux for the immersion heater was 10.9 KBTU per square foot per hour. The cooling coil was operated such that the outlet water from the basin was controlled at 60° C. After six hours the power transformer and the pH controller were turned off and the pH probe was removed from the basin. The water in the basin was cooled rapidly by resetting the thermoregulator to provide tap water circulation through the cooling coil. A sample of test solution was removed from the basin when it had cooled to 35° C., and it was analyzed for total hardness. The results are shown in Table C below. The reduction in total hardness was considered indicative of the scale formation in the system.

The run was repeated using the above procedure except that 2 ppm N,N-bis-phosphonomethyl taurine, a calcium insensitive phosphonomethyl amine, was added to the test solution prior to heating; another run was made using 10 ppm N,N-bis-phosphonomethyl 2-(hydroxyethoxy)ethylamine; and another run was made using 10 ppm 4-(phosphonomethyl)2-hydroxy-2-oxo-1,4,2-oxazaphosphorianane. The total hardness of the test solution at the conclusion of the run is shown in Table C below, as is the reduction in total hardness, and the calculated inhibition of scale formation.

TABLE C

| | | Test Solution Total Hardness (ppm) | | | Calculated Scale Inhibition |
|---|---|---|---|---|---|
| Run | Additive | Start | End | Change | % |
| 1 | Blank (without treatment) | 600 | 134 | 466 | — |
| 2 | N,N-Bis-phosphonomethyl taurine (2 ppm) | 600 | 586 | 14 | 97.0 |
| 3 | N,N-Bis-phosphonomethyl-2-(hydroxyethoxy) ethylamine (10 ppm) | 600 | 511 | 89 | 80.9 |
| 4 | 4-(Phosphonomethyl)-2-hydroxy-2-oxo-1,4,2-oxazaphosphorianane (10 ppm) | 600 | 586 | 14 | 97.0 |

The Examples encompass particular embodiments of the invention. Other embodiments will become apparent to those skilled in the art from a consideration of the specification or practice of the invention disclosed herein. It is understood that modifications and variations may be produced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A process for inhibiting the formation of scale in an aqueous system consisting essentially of the step of incorporating into the system water an effective amount of a water soluble phosphonomethyl amine compound wherein the phosphonomethyl amine is selected from 4-(phosphonomethyl)-2-hydroxy-2-oxo-1,4,2-oxaxaphosphorinane and its sodium and potassium salts; and having a cloud point of at least 25 ppm as determined by a CA500 cloud point test.

* * * * *